Aug. 12, 1952     H. O. HEDGES     2,606,531
INTERNAL-COMBUSTION ENGINE
Filed March 10, 1947     2 SHEETS—SHEET 1
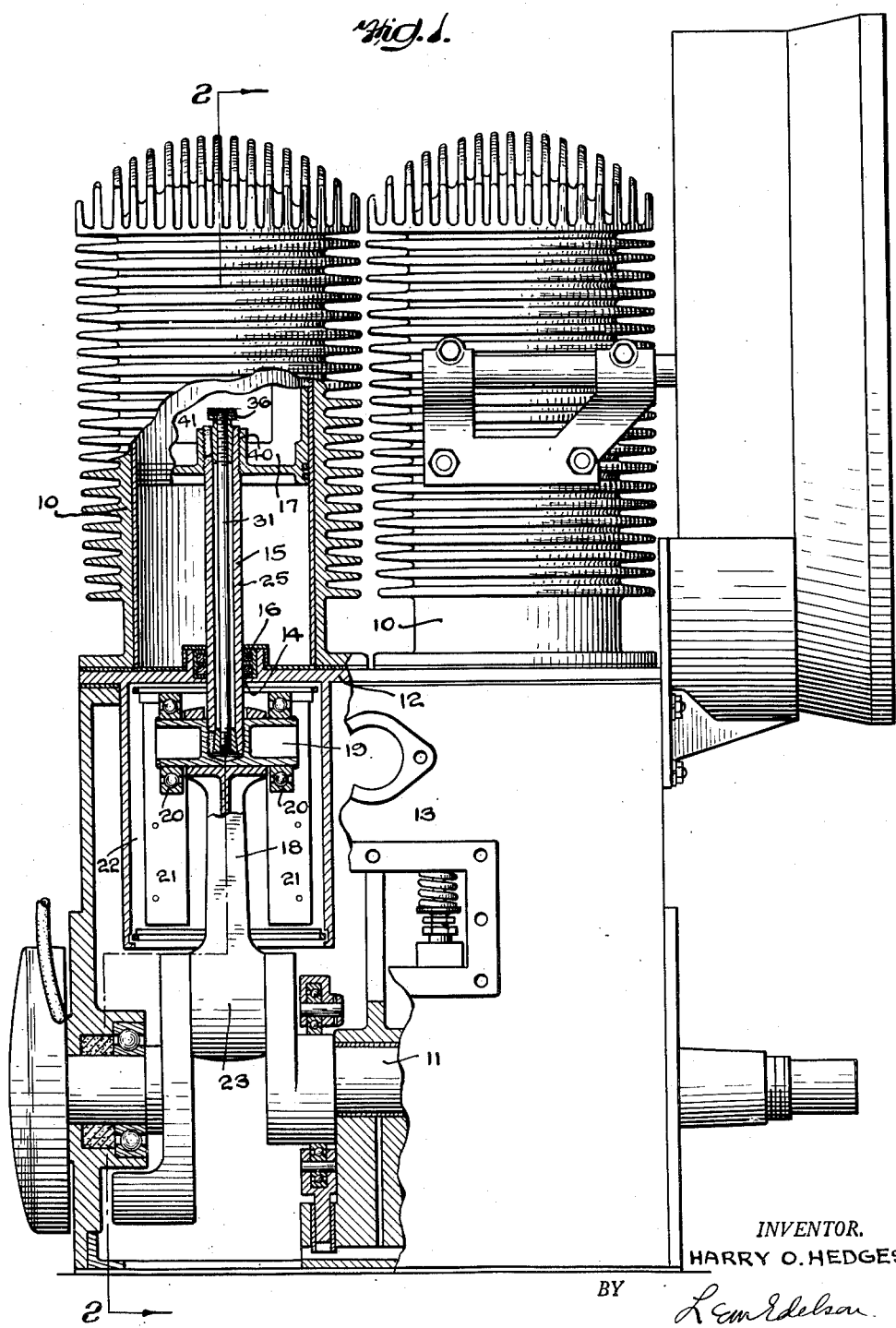
INVENTOR.
HARRY O. HEDGES
BY
*L. Ean Edelson*
ATTORNEY

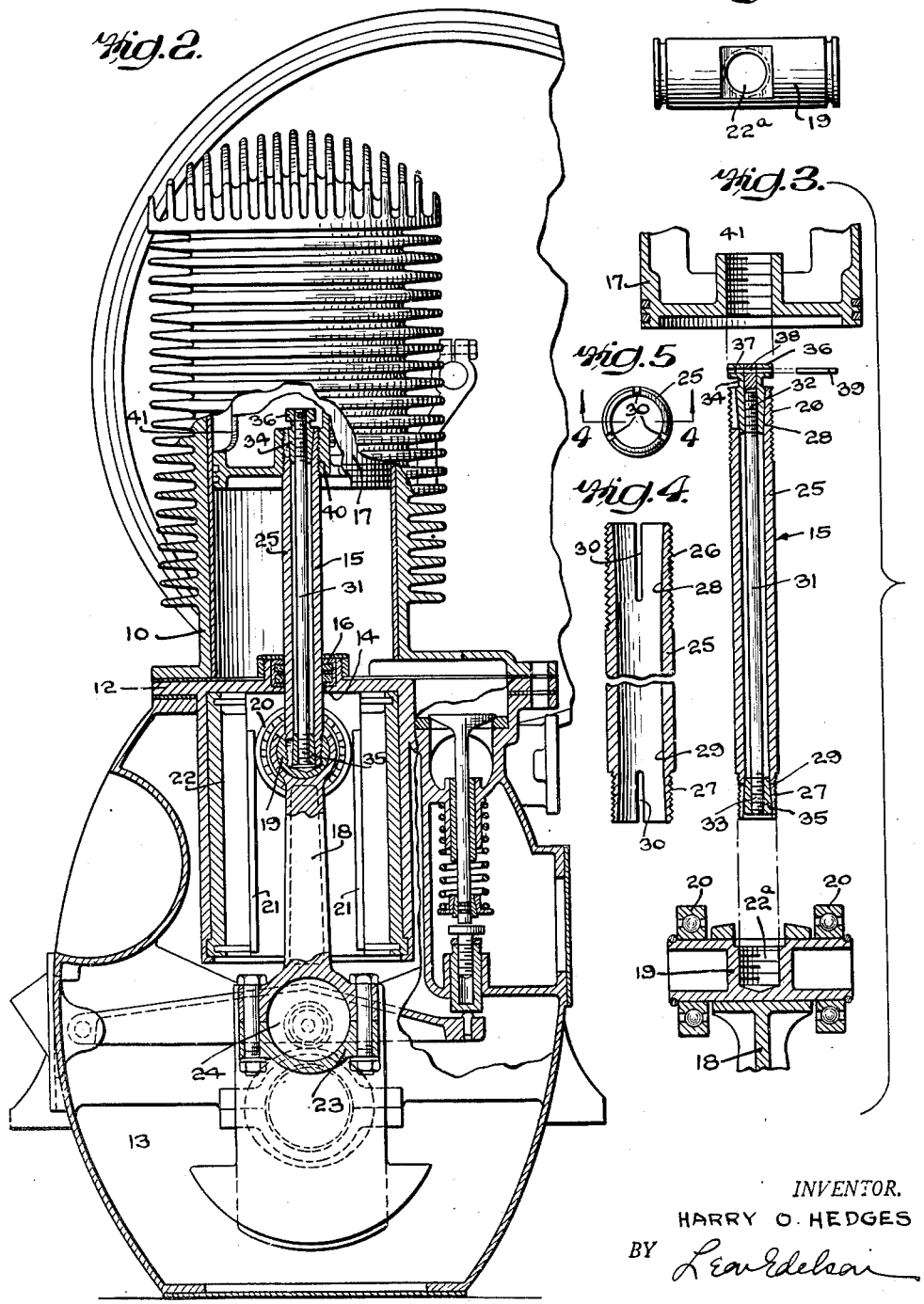

Patented Aug. 12, 1952

2,606,531

UNITED STATES PATENT OFFICE 2,606,531

INTERNAL-COMBUSTION ENGINE

Harry O. Hedges, Seattle, Wash., assignor to Hedges Motor Company, Seattle, Wash., a corporation of Washington Application March 10, 1947, Serial No. 733,684

7 Claims. (Cl. 121—1)

This invention relates generally to internal combustion engines and more particularly to improvements in the design and construction of the piston rod connecting the piston of the engine cylinder to the connection rod operatively associated with the engine crank shaft.

Among the principal objects of the present invention is to provide a piston rod assembly which is especially adapted for use in stationary or portable engines designed for operation on the two stroke cycle principle, such as is described in my copending application, Serial No. 601,585, filed June 26, 1945, now Patent No. 2,460,257, issued January 25, 1949, although it is to be understood that the piston rod construction of the present invention is applicable for use in other types of engines as well.

More specifically, it is the object of the present invention to provide a multiple-element piston rod assembly which is operative to insure secure and rigid connection between the cylinder piston and the crank shaft connecting rod, the assembly including simple means operating on the principle of a wedge to securely lock the opposite ends of the rod to the piston and connecting rod, respectively, against all possibility of becoming loosened due to vibrations and other shocks to which it may be subjected during operation of the engine.

Further objects are to provide a simple and effective piston rod connection which is inexpensive to manufacture and install, which is strong and durable in use, and which insures a permanently secure connection between the piston and the connecting rod while at the same time permitting its ready removal should the latter become necessary for purposes of repair or replacement of associated parts of the engine.

Other objects and advantages of the present invention will be apparent more fully hereinafter, it being understood that the present invention consists substantially in the combination, construction, location and relative arrangement of parts, all as described in detail hereinafter, as shown in the accompanying drawings, and as finally pointed out in the appended claims.

In the said accompanying drawings, which illustrate a preferred embodiment of the present invention:

Figure 1 is a view partly in vertical section and partly in side elevation of an engine employing the piston rod assembly of the present invention;

Figure 2 is a view also partly in vertical section and partly in elevation taken on the line 2—2 of Figure 1;

Figure 3 is an exploded view of the several elements of the piston rod assembly, each shown in section;

Figure 4 is a vertical sectional view of the tubular rod element of the assembly, as taken on the line 4—4 of Figure 5;

Figure 5 is an upper end view of the rod element shown in Figure 4; and

Figure 6 is a top plan view of the connecting rod crosshead to which the lower end of the piston rod assembly is secured.

Referring now more particularly to the drawings, it will be observed that the piston rod assembly of the present invention is shown for purposes of illlustration incorporated in an internal combustion engine of the type generally shown and described in my copending application, Serial No. 601,585, filed June 26, 1945, now Patent No. 2,460,257, issued January 25, 1949, such engine including one or more power cylinders 10, the axial line of each of which is arranged perpendicularly to the axial line of the main crankshaft 11. The power cylinders 10 are suitably mounted upon a base member 12 forming part of the crank case 13, the said base member being suitably apertured, as at 14, centrally of each cylinder 10 mounted thereon.

Each piston rod assembly, designated generally by the reference numeral 15, extends through the aperture 14 formed in the base member 12 and through a stuffing box 16 associated with said aperture, the upper end of each piston rod assembly being connected to the piston 17 within each cylinder and the lower end thereof being connected to the wrist pin of a connecting rod 18 which is operatively associated with the crank shaft 11 for imparting the desired reciprocating action to the piston through its guided rod 15, it being understood that the arrangement shown for effecting reciprocation of said rod 15 forms no part of the present invention. It may be stated here that various arrangements may be employed for guiding the travel of the piston rod and for opposing the lateral thrust of the connecting rod occasioned by the rotary motion of the crank shaft.

In the particular arrangement illustrated, the upper end of the connecting rod 18 is fitted with a wrist-pin 19 of generally cylindrical form (see Figure 6), the opposite ends of which have rotatably mounted thereon a pair of rollers 20—20 respectively adapted to travel between parallel guideways 21 suitably formed in the crosshead 22 for the connecting rod 18. The wrist-pin 19 is revolubly fitted within an arcuate seat provided therefor in the upper end of the connecting rod, the said wrist-pin 19 being provided with a central internally threaded socket 22ᵃ for reception of the lower threaded end of the piston rod assembly. The lower end 23 of the connecting rod is connected, in conventional manner, to the eccentric 24 of the crankshaft, it being understood, of course, that each cylinder piston is connected to a separate eccentric of the crankshaft by its own individual piston rod and a connecting rod associated therewith.

Referring now to the piston rod and wrist-pin assembly which forms the subject of the present invention, it will be noted that each such assembly (see particularly Figure 3) includes a tubular element 25 the opposite ends of which are externally threaded, as at 26 and 27, these threaded portions being internally tapered, as at 28 and 29, and being each provided with circumferentially spaced longitudinally extending slots 30. Also included in each piston rod assembly is a solid stem 31, the opposite ends of which are externally threaded, as at 32 and 33, to threadedly receive tapered plugs 34 and 35. As most clearly appears in Figure 3, the upper plug 34 is provided with a tool-engaging head 36, this head being in turn provided with a laterally extending bore 37 adapted for registry with a corresponding bore 38 formed in the upper end of the internal solid stem 31. A pin 39 is adapted to be projected into the registering bores 37 and 38 to securely lock the plug 34 in adjusted relation with respect to the stem 31.

The tapers of the plugs 34 and 35 are respectively such that when the same are tightly drawn into the correspondingly tapered ends of the tubular element 25 they tend to expand said ends and so cause the latter to be securely engaged within the threaded sockets respectively provided therefor in the piston 17 and in the wrist pin 19 of the connecting rod.

In connecting the piston to its associated connecting rod through the intervention of the piston rod assembly of the present invention, the lower plug 35 is first secured to the lower end of the stem 31 and the latter is then axially projected through the longitudinal bore of the tubular element 25 to locate the plug 35 within the tapered seat 27 of the element 25. The upper plug 34 is then threadedly secured to the upper end of the stem 31 to complete the assembly as shown in Figure 3.

The complete assembly of the parts 25, 31, 34 and 35 is then projected through the guide aperture 14 and its associated stuffing box 16 whereupon the lower externally threaded end 27 of the assembly is securely threaded into the socket 22 of the connecting rod wrist-pin 19. The upper externally threaded end 26 of the piston rod assembly is then threadedly connected, as at 40, to the lower end of the piston 17, this being readily effected by threading the piston upon the rod until the tool-engaging head 36 of the upper plug 34 extends freely within the interior of the piston 17, as shown in Figures 1 and 2. Access to the tool-engaging head 36 of the plug 34 is conveniently had by way of the side opening 41 in the piston 17, the construction and function of said opening being described more fully in my copending application aforesaid. Upon tightening the plug 34 relatively to its associated stem 31, it will be apparent that both of the plugs 34 and 35 will be drawn into their respective tapered seats 26 and 27 as to expand the opposite threaded ends of the tubular member 25 into securely locked connection with the piston 17 on the one end and with the wrist-pin 19 on the other end. The plug 34 is itself secured against displacement from its adjusted position relatively to the stem 31 by projecting the pin 39 (see Figure 3) through the registering transversely extending bores 37 and 38 in the members 34 and 31.

Having so connected each piston to its operatively associated connecting rod wrist pin, the pistons are then fitted within their cylinders 10 by slipping the latter over the pistons, the cylinders being then secured in place in conventional manner to complete the engine asembly. It will be understood, of course, that the present invention is susceptible of various changes which may be made from time to time without departing from the general principles or real spirit thereof, and it is accordingly intended to claim the same broadly as well as specifically as indicated in the appended claims.

What is claimed as new and useful is:

1. In an internal combustion engine having a power cylinder, a piston reciprocally mounted therein, a crankshaft and a connecting rod operatively mounted on said crankshaft, and a wrist pin oscillatably journalled in the free end of said connecting rod, said piston being provided with a threaded socket coaxial with the piston and said wrist pin having a threaded socket extending normal to the axis of oscillation of said wrist pin: a piston rod assembly extending between and inter-connecting said piston and crank shaft, said assembly including a tubular stem having its opposite ends respectively threaded into the threaded sockets of said piston and wrist pin and means operative to expand said threaded ends of the tubular stem into securely locked engagement with said threaded sockets, respectively, said last mentioned means including a solid rod extending axially of said tubular stem and having fitted upon opposite ends thereof tapered plugs adapted to spread the threaded ends of the tubular stem as said plugs are wedged into the opposite ends of said stem.

2. In an internal combustion engine having a power cylinder, a piston reciprocally mounted therein, a crankshaft and a connecting rod operatively mounted on said crankshaft, and a wrist pin oscillatably journalled in the free end of said connecting rod, said piston and wrist pin being respectively provided with coaxial threaded sockets; a tubular stem having its opposite ends respectively threaded into said sockets, the ends of the stem received in said sockets being longitudinally slitted and internally tapered, a tapered plug fitted in each end of the tubular stem, and means for drawing said plugs axially toward each other whereby to expand the threaded ends of said stem into securely locked engagement with their respective sockets aforesaid.

3. In an internal combustion engine having a power cylinder, a piston reciprocally mounted therein, a crankshaft and a connecting rod operatively mounted on said crankshaft, and a wrist pin oscillatably journalled in the free end of said connecting rod, said piston and wrist pin being respectively provided with coaxial threaded sockets: a tubular stem having its opposite ends respectively threaded into said sockets, the ends of the stem received in said sockets being longitudinally slitted and internally tapered, a tapered plug fitted in each end of the tubular stem, and means for drawing said plugs axially toward each other whereby to expand the threaded ends of said stem into securely locked engagement with their respective sockets aforesaid, said last mentioned means including a solid rod extending axially of the tubular stem with its opposite ends respectively threaded into said plugs.

4. In an internal combustion engine having a power cylinder, a piston reciprocally mounted therein, a crankshaft and a connecting rod operatively mounted on said crankshaft, and a wrist pin oscillatably journalled in the free end of said connecting rod, said piston and wrist pin being respectively provided with coaxial threaded sockets: a tubular stem having its opposite ends respectively threaded into said sockets, the ends of the stem received in said sockets being longitudinally slitted and internally tapered, a tapered plug fitted in each end of the tubular stem, and means for drawing said plugs axially toward each other whereby to expand the threaded ends of said stem into securely locked engagement with their respective sockets aforesaid, said last mentioned means including a solid rod extending axially of the tubular stem with its opposite ends respectively threaded into said plugs, one of said plugs being provided with a tool-engaging head projecting freely beyond the end of the tubular stem into which said plug is fitted whereby said plug may be adjusted axially of the solid rod toward the opposite plug to effect the expansion of the threaded opposite ends of the tubular stem as aforesaid.

5. In an internal combustion engine, a piston reciprocable within a power cylinder of the engine, said piston having a threaded opening in the bottom thereof and an opening in the side wall thereof affording access to the inner end of said threaded opening, and a piston rod assembly for connecting said piston to a connecting rod operatively mounted upon the engine crankshaft, said assembly including a wrist pin oscillatably journalled in the free end of said connecting rod and having a threaded socket coaxial with the longitudinal axis of the piston and the threaded opening in the bottom thereof, a tubular stem having its opposite ends respectively threaded into said sockets, said opposite ends of the stem being each longitudinally slitted to render the same expansible, a tapered plug fitted in each end of the tubular stem and adapted to be forced axially toward each other to expand said expansible ends of the stem into securely locked engagement within their respective sockets aforesaid, said plugs being interconnected by a solid rod extending axially through the bore of said stem and one of said plugs being provided with a tool-engaging head to which access is had by way of the opening in the side wall of said piston.

6. In an internal combustion engine, a piston reciprocable within a power cylinder of the engine, said piston having a threaded opening in the bottom thereof and an opening in the side wall thereof affording access to the inner end of said thread-opening, and a piston rod assembly for connecting said piston to a connecting rod operatively mounted upon the engine crankshaft, said assembly including a wrist pin oscillatably journalled in the free end of said connecting rod and having a threaded socket coaxial with the longitudinal axis of the piston and the threaded opening in the bottom thereof, a tubular stem having its opposite ends respectively threaded into said sockets, said opposite ends of the stem being each longitudinally slitted to render the same expansible, a tapered plug fitted in each end of the tubular stem and adapted to be forced axially toward each other to expand said expansible ends of the stem into securely locked engagement wtihin their respective sockets aforesaid, said plugs being interconnected by a solid rod extending axially through the bore of said stem and one of said plugs being provided with a tool-engaging head to which access is had by way of the opening in the side wall of said piston, and means for keying said last-mentioned plug in its axially adjusted position relatively to said solid rod.

7. In an internal combustion engine, a piston reciprocable within a power cylinder of the engine and having a piston rod fixed thereto and extending axially from the cylinder, a crankshaft, a connecting rod mounted on said crankshaft, said connecting rod having a freely-extending end in the shape of an arcuate seat for a transversely extending wrist-pin, and a wrist-pin oscillatably mounted in said seat for connection to said piston rod, said wrist-pin being provided with a threaded socket axially alineable with said piston rod and said piston rod being provided with a threaded extremity adapted to be fitted in said threaded socket.

HARRY O. HEDGES.

REFERENCES CITED

The following references are of record in the file of this patent:

UNITED STATES PATENTS

| Number | Name | Date |
| --- | --- | --- |
| 912,751 | Steely | Feb. 16, 1909 |
| 1,112,737 | Vogt | Oct. 6, 1914 |
| 1,385,005 | Keller | July 19, 1921 |
| 1,910,187 | Sneed | May 23, 1933 |
| 1,970,960 | Groff | Aug. 21, 1934 |
| 2,249,802 | Wilson | July 22, 1941 |

FOREIGN PATENTS

| Number | Country | Date |
| --- | --- | --- |
| 606,017 | France | Feb. 27, 1926 |
| 111,297 | Australia | Aug. 29, 1940 |